United States Patent
Renard et al.

(10) Patent No.: US 9,723,186 B2
(45) Date of Patent: Aug. 1, 2017

(54) LOW PROFILE CAMERA MODULE WITH IMAGE COMPENSATION

(71) Applicant: STMicroelectronics Pte Ltd., Singapore (SG)

(72) Inventors: Loic Pierre Louis Renard, Singapore (SG); Wee Chin Judy Lim, Singapore (SG)

(73) Assignee: STMicroelectronics Pte Ltd, Singapore (SG)

( * ) Notice: Subject to any disclaimer, the term of this patent is extended or adjusted under 35 U.S.C. 154(b) by 13 days.

(21) Appl. No.: 14/183,937

(22) Filed: Feb. 19, 2014

(65) Prior Publication Data

US 2015/0237245 A1 Aug. 20, 2015

(51) Int. Cl.
| H04N 5/225 | (2006.01) |
| H04N 17/00 | (2006.01) |
| H04N 5/217 | (2011.01) |
| H04N 5/357 | (2011.01) |

(52) U.S. Cl.
CPC ........... *H04N 5/2254* (2013.01); *H04N 5/217* (2013.01); *H04N 5/2257* (2013.01); *H04N 5/3572* (2013.01); *H04N 17/002* (2013.01); *Y10T 29/49128* (2015.01)

(58) Field of Classification Search
CPC ............... H04N 5/2224; H04N 5/2257; H01L 27/14618; G02B 9/02; G02B 13/001–13/009; G02B 13/0055; G06T 7/0018

USPC ........ 348/187, 188, 340; 359/581, 647, 718, 359/808, 809, 811, 819; 257/432–437, 257/680; 250/239

See application file for complete search history.

(56) References Cited

U.S. PATENT DOCUMENTS

| 7,022,066 B2* | 4/2006 | Yokoi | A61B 1/04 348/65 |
| 7,529,424 B2* | 5/2009 | Ahiska | H04N 5/217 348/335 |
| 7,821,564 B2* | 10/2010 | Avron | G02B 7/022 348/340 |
| 7,893,992 B2* | 2/2011 | Vittu | G03B 13/36 348/357 |
| 7,936,062 B2* | 5/2011 | Humpston | B81C 1/00269 257/680 |
| 8,587,718 B2* | 11/2013 | Ichimura | H04N 5/2254 348/375 |
| 8,637,800 B2* | 1/2014 | Kozlowski | H01L 27/14634 250/208.1 |
| 2001/0015767 A1* | 8/2001 | Miyake | H01L 27/14618 348/374 |
| 2004/0165095 A1* | 8/2004 | Shimizu | G02B 3/04 348/335 |

(Continued)

*Primary Examiner* — Nhan T Tran
*Assistant Examiner* — Chris Yoder, III
(74) *Attorney, Agent, or Firm* — Seed IP Law Group LLP (57) ABSTRACT

A low-cost resin lens is disclosed for use in miniature cameras. The resin lens features a low profile that is particularly well-suited to consumer products such as smart phones. The resin lens is mounted to an integrated circuit die that is attached to a standard four-layer substrate. The integrated circuit die includes electronic and/or optoelectronic circuits to support digital image capture, transfer, and processing. Image correction software adjusts the image to correct for distortion introduced by the resin lens.

16 Claims, 6 Drawing Sheets

(56) References Cited

U.S. PATENT DOCUMENTS

| | | | | |
|---|---|---|---|---|
| 2005/0231812 A1* | 10/2005 | Leu | .......................... | G02B 3/00 |
| | | | | 359/642 |
| 2007/0238322 A1* | 10/2007 | Meier | .................... | H05K 1/147 |
| | | | | 439/65 |
| 2010/0225799 A1* | 9/2010 | Fujimori | ............ | A61B 1/00163 |
| | | | | 348/335 |
| 2011/0037656 A1* | 2/2011 | Bremner | .................. | H01Q 1/38 |
| | | | | 343/700 MS |
| 2011/0194022 A1* | 8/2011 | Yang | .................... | H04N 5/2251 |
| | | | | 348/374 |

\* cited by examiner

LOW PROFILE CAMERA MODULE WITH IMAGE COMPENSATION

BACKGROUND

Technical Field

The present disclosure generally relates to the design and fabrication of low profile cameras for use in consumer electronic devices, and methods of correcting images using a built-in hardware filter.

Description of the Related Art

Mobile electronic devices such as laptop computers, tablet computers, smartphones, and the like typically come equipped with miniature digital cameras that are recessed below an outside surface of the device. Because the electronic devices are thin, there is not much room for a camera lens incorporated into the case to extend in a direction transverse to the screen surface. Thus, low-profile lenses are useful in such applications.

In some electronic device applications, the camera lens is used primarily as a motion detector, for example, which generally does not require high quality image capture. If the camera is targeted for such applications, it is not necessary to form the camera lens out of glass and to grind the lens with precision to achieve superior optical quality and performance. However, existing cameras are often made to the same high standard, regardless of their application.

BRIEF SUMMARY

A low-profile camera module, for use in applications in which approximate image capture is sufficient, is equipped with an inexpensive resin lens, and an image compensation system. The image compensation system can be calibrated using a known test image so that an offset can be applied to images captured by the resin lens to compensate for poor lens quality. Such a low-profile camera module can be used effectively as, for example, a motion detector, a face recognition device in a security system, a device for monitoring hand movements at close range, and the like.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of semiconductor processing comprising embodiments of the subject matter disclosed herein have not been described in detail to avoid obscuring the descriptions of other aspects of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

Fabrication of microcircuits generally entails performing a series of deposition and patterning operations to build integrated structures on a semiconductor substrate, one layer at a time. Each layer is formed by growing or depositing a film on the substrate, patterning a photo-sensitive mask using lithography, and transferring the mask pattern to the film by etching. Often, structures already formed on the substrate are protected by hard masks while new structures are created. Such use of hard masks adds masking layers to the fabrication process. Overall fabrication costs scale with the number of layers used and the number of mask patterning cycles needed. Lithography masks are expensive to design and to integrate into an existing fabrication process. For these reasons, it is generally advantageous to reduce the number of mask patterning cycles if alternative processing schemes can be substituted.

Reference throughout the specification to integrated circuits is generally intended to include integrated circuit components built on semiconducting substrates, whether or not the components are coupled together into a circuit or able to be interconnected. Throughout the specification, the term "layer" is used in its broadest sense to include a thin film, a cap, or the like.

Reference in the specification to conventional thin film deposition techniques for depositing silicon nitride, silicon dioxide, metals, or similar materials include such processes as chemical vapor deposition (CVD), low-pressure chemical vapor deposition (LPCVD), metal organic chemical vapor deposition (MOCVD), plasma-enhanced chemical vapor deposition (PECVD), plasma vapor deposition (PVD), atomic layer deposition (ALD), molecular beam epitaxy (MBE), electroplating, electro-less plating, and the like. Specific embodiments are described herein with reference to examples of such processes. However, the present disclosure and the reference to certain deposition techniques should not be limited to those described. For example, in some circumstances, a description that references CVD may alternatively be done using PVD, or a description that specifies electroplating may alternatively be accomplished using electro-less plating. Furthermore, reference to conventional techniques of thin film formation may include growing a film in-situ. For example, in some embodiments, controlled growth of an oxide to a desired thickness can be achieved by exposing a silicon surface to oxygen gas or to moisture in a heated chamber.

Reference in the specification to conventional photolithography techniques, known in the art of semiconductor fabrication for patterning various thin films, includes a spin-expose-develop process sequence typically followed by an etch process. Alternatively or additionally, photoresist can also be used to pattern a hard mask such as, a silicon nitride hard mask, which, in turn, can be used to pattern an underlying film.

Reference in the specification to conventional etching techniques known in the art of semiconductor fabrication for selective removal of polysilicon, silicon nitride, silicon dioxide, metals, photoresist, polyimide, or similar materials includes such processes as wet chemical etching, reactive ion etching (RIE), washing, wet cleaning, pre-cleaning, spray cleaning, chemical-mechanical planarization (CMP) and the like. Specific embodiments are described herein with reference to examples of such processes. However, the present disclosure and the reference to certain deposition techniques should not be limited to those described. In some instances, two such techniques may be interchangeable. For example, stripping photoresist may entail immersing a sample in a wet chemical bath or, alternatively, spraying wet chemicals directly onto the sample.

Specific embodiments are described herein with reference to a low profile camera module and associated components that have been produced; however, the present disclosure and the reference to certain materials, dimensions, and the details and ordering of processing steps are exemplary and should not be limited to those shown. The term "photonic" is used as a counterpart to the term "electronic" to describe miniaturized light circuits. The term "opto-electronic" refers to combinations of electronic and photonic circuits and/or circuit elements.

In the figures, identical reference numbers identify similar features or elements. The sizes and relative positions of the features in the figures are not necessarily drawn to scale.

Figure 1A:
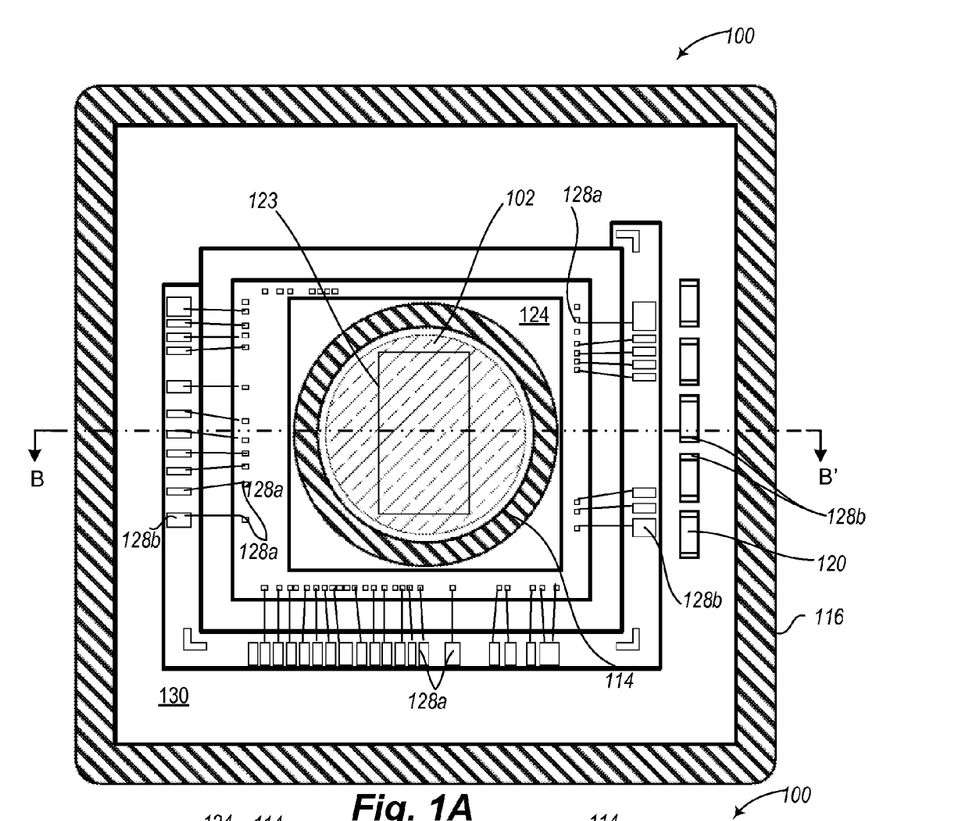
FIG. 1A is a cross-sectional view taken along lines A-A' of FIG. 1B of a low profile camera module, according to one embodiment disclosed herein.
Figure 1B:
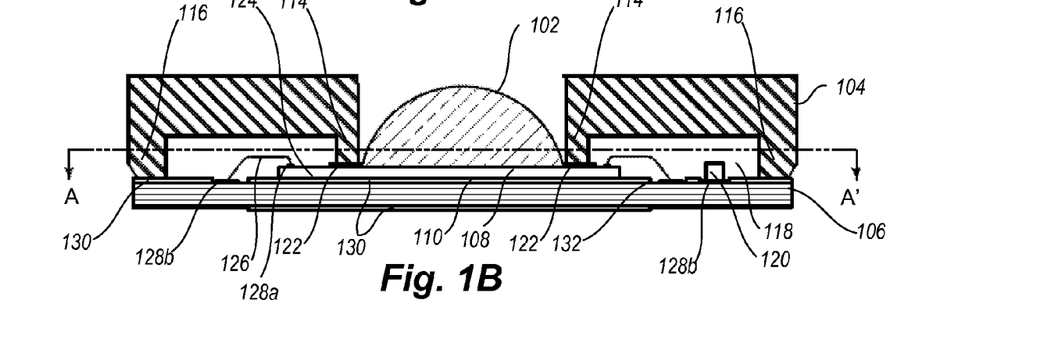
FIG. 1B is a cross-sectional view of the low profile camera module shown in FIG. 1A, taken along cut lines B-B'.

FIGS. 1A and 1B illustrate cross-sectional views of a low profile camera module 100, according to one embodiment. The footprint area of the low profile camera module 100 is in the range of approximately 3-5 mm$^2$. The low profile camera module 100 includes a microlens in the form of a resin lens 102, a housing 104 surrounding the microlens, a multi-layer substrate 106, and an integrated circuit die 108. The die 108 is attached to the multi-layer substrate 106 by a die attach film 110. In one embodiment, the low profile camera module 100 can further include an optional adjustable or removable cover—with the housing 104.

The resin lens 102 of the low profile camera module 100 has a substantially hemispherical shape, having a diameter that depends at least in part on the size of an image sensor array described below in further detail. To maintain the low profile, the height of the resin lens 102 should not extend beyond the top of the housing 104.

The housing 104 can be made of, for example, a reflowable or non-reflowable thermoplastic material such as a liquid crystal polymer (LCP), FAG, LA 121, or the like. In one embodiment, the housing 104 is in the form of a one-piece arched surround structure having a center opening. The housing 104 has a circular annular inner foot 114 and a square annular outer foot 116, so that there is open space 118 between the housing 104 and the multi-layer substrate 106. The square annular outer foot 116 follows approximately the perimeter of the low profile camera module 100 on the multi-layer substrate 106. The circular annular inner foot 114 follows approximately the circumference of the resin lens 102. The open space 118 accommodates circuit components 120 mounted on the integrated circuit die 108, while providing protection for such components. In one embodiment, the optional cover can be formed as part of the one-piece molded structure.

The resin lens 102 can be a microlens that is made of glass and then coated with a resin material, or the resin lens 102 can be made partially or wholly from the resin material itself. In most instances, glass provides a higher quality microlens, but the cost is significantly higher, whereas a lens can be made substantially of a thermoplastic resin at a much lower cost. When the lower-cost resin lens is used, the image produced by the sensor can be electronically improved, as explained later herein.

A resin lens 102 can be made from a pre-molded assembly. In one embodiment, such an assembly includes a microlens having a pre-molded resin covering and an extended resin flange 122 on which to seat the annular inner foot 114 of the housing 104. The housing 104 then rests on the extended resin flange 122 thereby securing the resin lens 102 on top of the integrated circuit die 108. The housing 104 thus serves as a mount for the resin lens 102.

The integrated circuit die 108 can be, for example, a standard packaged optical integrated circuit die operable to capture, transmit, and process images. Such an integrated circuit die 108 can include for example, the electronic image sensor array 123, located at a focal plane behind the resin lens 102. Elements of the image sensor array 123 may be, for example, charge-coupled devices (CODs). The integrated circuit die 108 can further include an electronic memory for storing image data, a processor such as an image processor, and the like, as discussed with respect to FIG. 4.

The integrated circuit die is fabricated according to standard semiconductor processing techniques known in the art, and generally described above. Such processing entails deposition and patterning of a series of thin films, wherein the patterning includes application of a photosensitive mask, optical exposure of the mask according to a circuit design pattern, and etching the pattern into the underlying film. Exposed surfaces of the integrated circuit die 108 are covered with a passivation layer 124.

The circuits in the integrated circuit die 108 are electrically coupled to the multi-layer substrate 106 by wire bonds 126 from contact pads 128a on the die to contact pads 128b that provide electrical signal paths to interconnects within the multi-layer substrate 106. Various circuit components 120, such as capacitors and resistors, are also mounted to the multi-layer substrate 106 via contacts 128b. The contact pads 128a and 128b, being exposed to the open space 118, desirably have an upper layer made of gold or a similar non-reactive metal to avoid corrosion. The die attach film 110 is an adhesive film that attaches the integrated circuit die 108 to the multi-layer substrate 106. Additionally or alternatively, the underside of the integrated circuit die 108 can be patterned with a ball grid array (BPA) or a land grid array (LGA) of contact pads to facilitate electrical connections to the image sensor array 123, memory, and processor therein, via the multi-layer substrate 106.

The multi-layer substrate 106 can be, for example, a standard four-layer customizable printed circuit board (PCB). The PCB can include, for example, two metal interconnect layers separated by composite material layers made of glass fiber and epoxy resin, on a semiconductor substrate. The metal interconnects can be made of copper, nickel, aluminum, gold, or combinations thereof. Exposed upper and lower surfaces of the multi-layer substrate 106 are covered with solder masks 130. The upper solder mask 130 includes openings 132 to allow solder attachment of the circuit components 120 to the top metal layer of the multi-layer substrate 106.

With reference to FIGS. 1A, 1B, 2A, and 2B, generalized steps in a first fabrication method 140 for producing the low profile camera module 100 are described and shown, according to one embodiment.

Figure 2A:
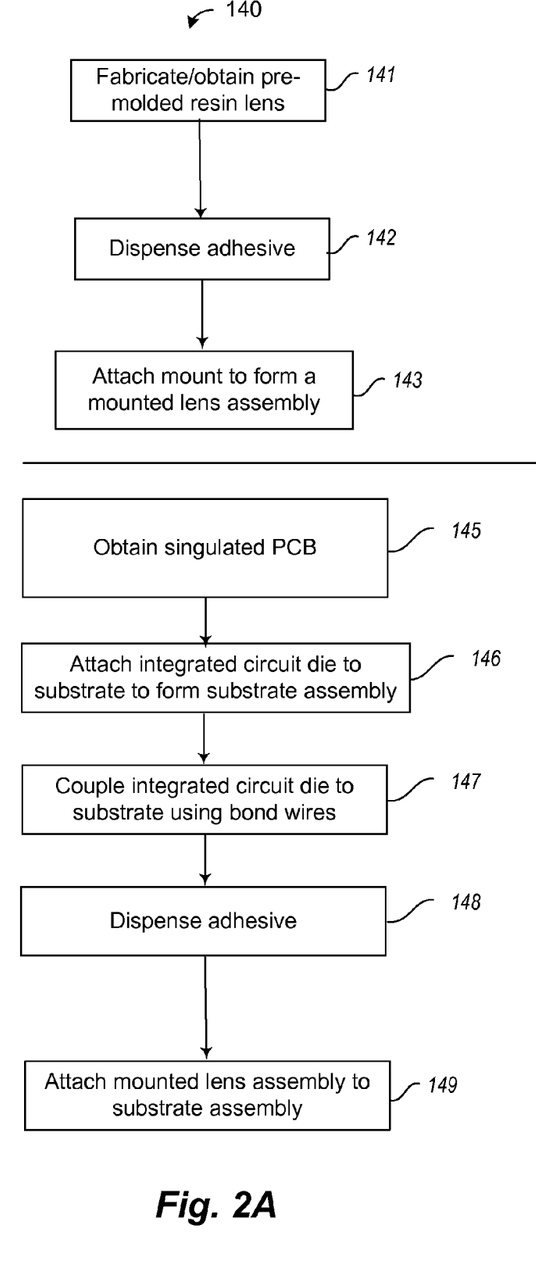
FIG. 2A is a high-level process flow diagram showing an overview of a method of making the low profile camera module, according to a first embodiment.
Figure 2B:
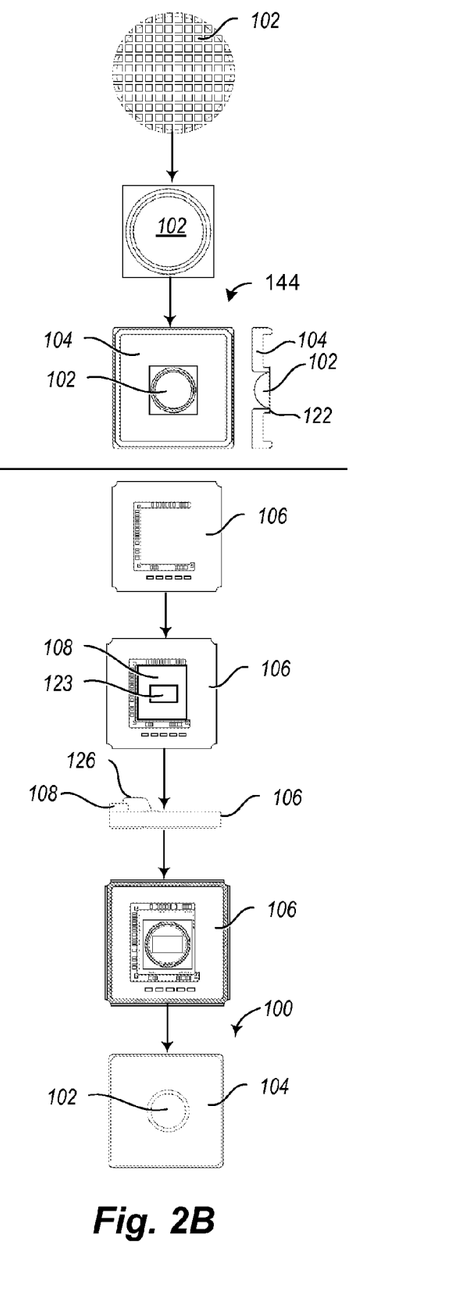
FIG. 2B is a series of illustrations showing the low profile camera after completion of the corresponding process step shown in FIG. 2A.

At 141, pre-molded resin micro-lenses 102 are fabricated or obtained from a supplier such as a commercial vendor, and singulated into individual units.

At 142, an adhesive such as an epoxy is dispensed outside the circumference of the micro-lens 102, on the extended resin flange 122.

At 143, the housing 104 is mounted to the extended resin flange 122 to form a mounted lens assembly 144. After mounting the housing 104, the housing 104 may be cured, for example, by heating to an elevated temperature, or by exposure to UV light.

At 145, multi-layer substrates 106 are fabricated or obtained from a supplier such as a commercial vendor, and singulated into individual units.

At 146, the integrated circuit die 108 is attached to the multi-layer substrate 106 using the die attach film 110, to form a substrate assembly. The integrated circuit die 108 may be a commercially available chip for use in electronic cameras, or a custom chip that includes the electronic image sensors 162, a microprocessor 164 that can be a general purpose processor or an image processor, and the memory 166.

At 147, the wire bonds 126 are added to provide electrical access to the components within the integrated circuit die 108 via the contact pads 128a.

At 148, an adhesive, for example an epoxy, is dispensed in two locations—around the perimeter of the integrated circuit die 108, and also around the perimeter of the multi-layer substrate 106.

At 149, the mounted lens assembly 144 is attached by the adhesive to the completed substrate assembly.

With reference to FIGS. 1A, 1B, 3A and 3B, generalized steps in a second, alternative fabrication method 150 for producing the low profile camera module 100 are described and shown.

Figure 3A:
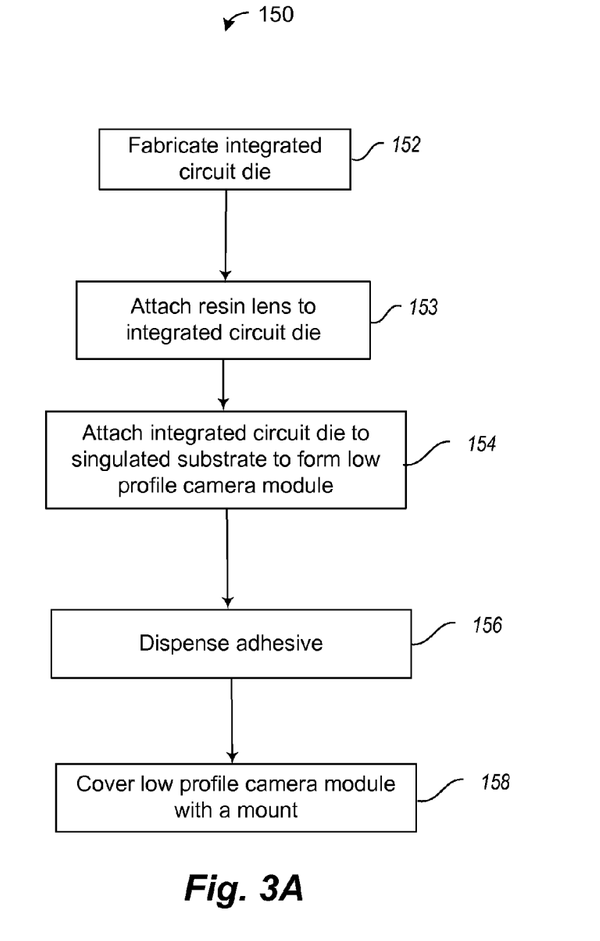
FIG. 3A is a high-level process flow diagram showing an overview of a method of making the low profile camera module, according to a second embodiment.
Figure 3B:
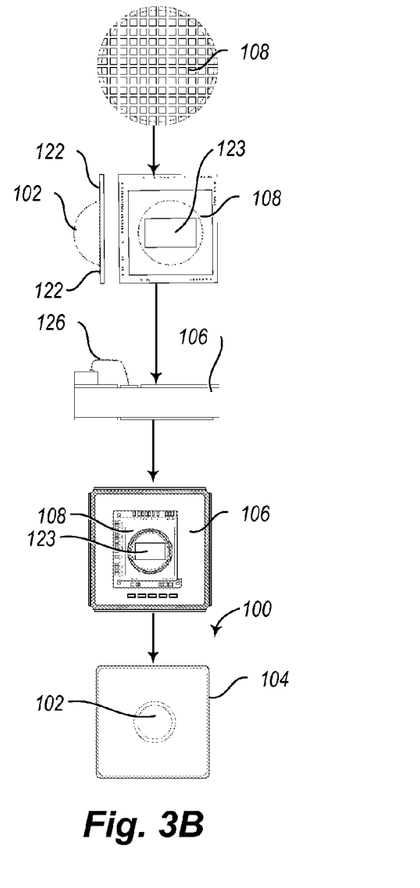
FIG. 3B is a series of illustrations showing the low profile camera after completion of the corresponding process step shown in FIG. 3A.

At 152, the integrated circuit die 108 is either custom fabricated or obtained as a commercially available unit for use in electronic cameras. The integrated circuit die 108 may be a custom chip that includes the image sensor array 123 and other electronic circuits explained elsewhere herein.

At 153, the resin lens 102 is secured to the integrated circuit die 108 prior to singulation of the wafer that includes integrated circuit die 108 and prior to wire-bonding to minimize disruption to the bond wires. The microlens can be a small liquid drop of resin that is cured, or a pre-molded resin lens. At 154, the integrated circuit die 108 is attached to a singulated multi-layer substrate 106 using the die attach film 110, which is an adhesive. Wire bonds 126 are added to provide electrical access to the components within the integrated circuit die 108 via the contact pads 128a.

At 156, an adhesive is dispensed outside the circumference of the micro-lens 102, on the extended resin flange 122. The housing 104 is then attached to the extended resin flange 122.

At 158, the resin lens 102 is optionally covered with a removable or adjustable liner to prevent particles from landing on the resin lens 102 or from becoming trapped around the resin lens 102 prior to mounting in a consumer product, or when the camera module 100 is not in use.

Figure 4:
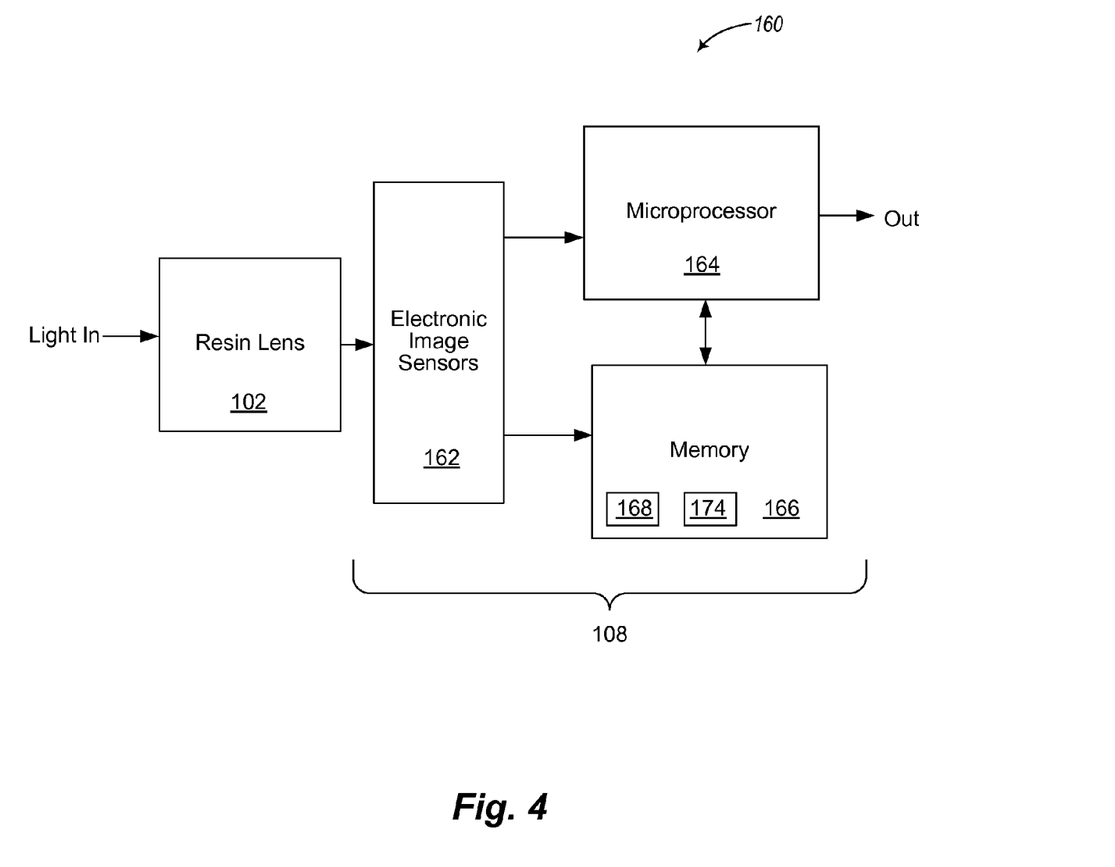
FIG. 4 is a block diagram of a microelectronic image compensation system to support the low profile camera module, as described herein.

FIG. 4 illustrates a schematic block diagram of a microelectronic image compensation system 160, according to one exemplary embodiment. The microelectronic image compensation system 160 includes the resin lens 102, an image sensor array 123, a microprocessor 164, a memory 166, and code within the memory 166 containing instructions 168 for image compensation. Reference data 174 is also stored in the memory, as explained elsewhere herein. The image sensor array 123, the microprocessor 164, and the memory 166 can all be implemented as circuitry within the integrated circuit die 108.

Figure 5A:
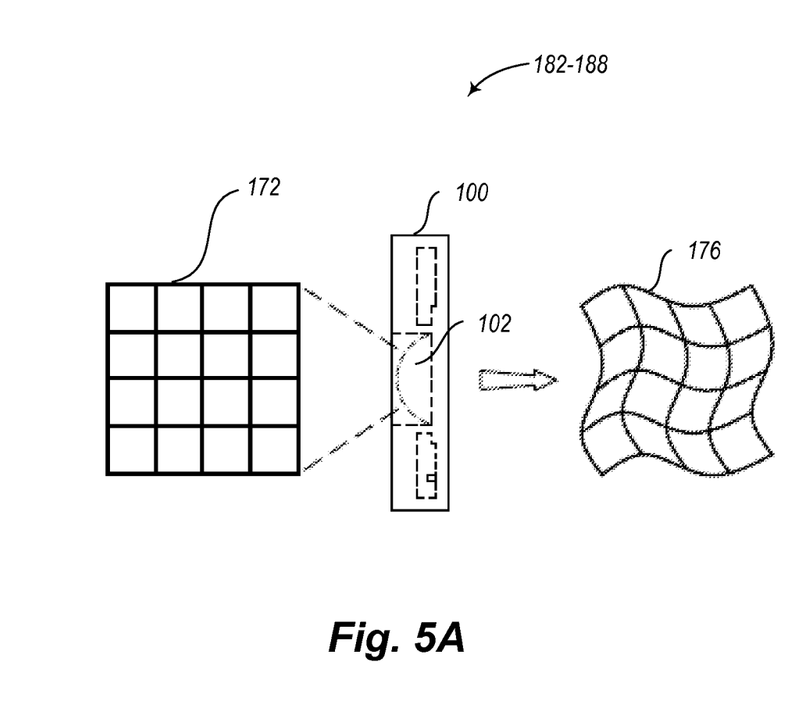
FIGS. 5A and 5B are schematic diagrams illustrating operation of the microelectronic image compensation system shown in FIG. 4.
Figure 5B:
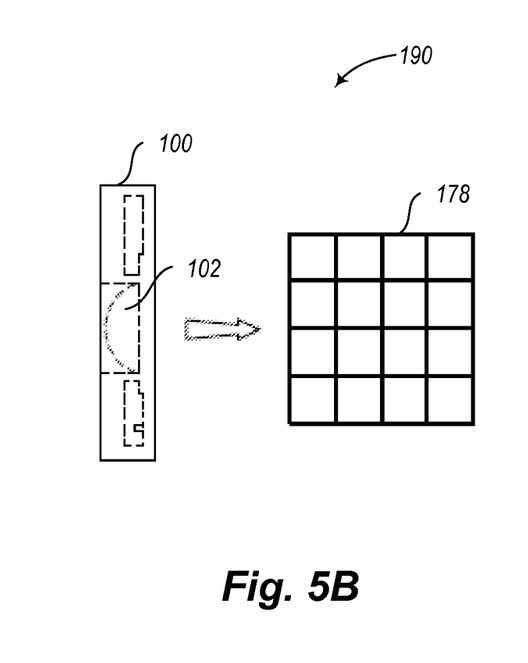

FIGS. 5A and 5B illustrate an exemplary calibration procedure 180 carried out by the image compensation system 160, according to one embodiment. Operation of the image compensation system 160 entails use of a test pattern 172 and associated reference data 174, the low profile camera module 100, and generation of test pattern image data 176 to produce corrected image data 178.

With reference to FIGS. 4, 5A-5B, and 6, the calibration procedure 180 for image compensation of the low profile camera module 100 is described. Such a method can be coded as instructions 168, stored in the memory 166.

Figure 6:
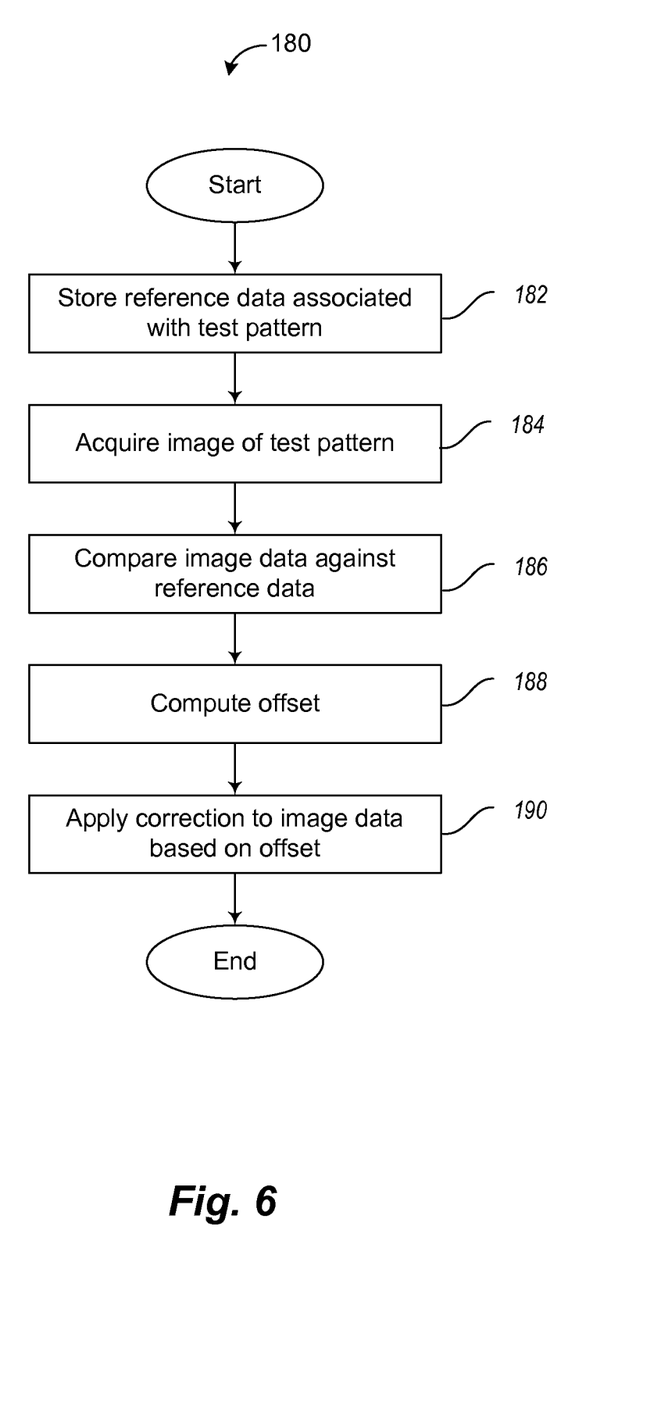
FIG. 6 is a flow diagram showing a sequence of steps used to calibrate and operate the microelectronic image compensation system.

At 182, reference data 174 that corresponds to the test pattern 172 is stored in the memory 166.

At 184, the microprocessor 164 triggers the low profile camera module 100 to acquire an image of the test pattern 172 via the image sensor array 132. Such a trigger may occur, for example, in response to a calibration request. The image sensor array 132 produces image data 176, which is stored in the memory 166. Because the resin lens 102 is an inexpensive optical element of less than optimal quality, image data 176 is generally expected to be distorted as shown in FIG. 5.

At 186, the distorted image data 176 is compared with the reference data 174, which accurately depicts the test pattern 172. Such a comparison is carried out in the microprocessor 164, according to the instructions 168.

At 188, the microprocessor 164 computes an offset in the electronic data from test image 172 that represents the difference between the actual test pattern 172 and the distorted image data 176.

At 190, a correction based on the offset is applied to the distorted image data 176 to produce the corrected image data 178. The corrected image data 178 should substantially match the actual test pattern 172.

It is expected that in most embodiments there will be a plurality of test patterns 172 and corresponding reference data 174. Each of the test patterns will be designed to mimic an expected image that the camera will take during operation. For example, a first test pattern may mimic fine line resolution and close-up images. A second test pattern may mimic human faces, including a distinction between different expressions on a face, or genders. Another test pattern may mimic landscape images, such as trees, lakes, and the like. Another test pattern may mimic close-up nature photographs such as flowers or insects, while yet another test pattern 172 may mimic long-range photographs such as mountains in the distance. Other test patterns may mimic a combination of such types of images, such as people standing with a background close behind them and also people with a distant background such as a mountain behind them. In some embodiments, only one test pattern 172 will need to be used in order to properly compute the offset amount and store the offset electronic data in the memory 166. In other embodiments, the offset is computed after performing a number of comparisons between various different types of test patterns 172 to be matched with the corresponding reference data 174. In one embodiment, the results of all of the comparisons between the various different types of test patterns and the reference data 174 are combined to compute an overall offset for all images to be taken with the camera. In an alternative embodiment, or in addition to the combined offset calculation, an individual offset calculation can be performed for each type of image. For example, an offset can be computed for a test pattern that includes human faces and stored as an offset to be used with respect to photographs that contain human faces. Another test pattern can be stored for distant image acquisition, such as mountains in the distance, and this offset stored as an individual, separate offset to be used only on images that are particular to that particular offset, namely long distance, landscape pictures.

Since general image recognition software exists today that can detect whether an image includes such features as human faces, distant mountains, and the like, the details of such software are not described herein. Similarly, the specific software code and mathematical algorithms to create the offset between the actual test pattern 172 and reference data 174 are not described herein in detail, since the use of digital offsets to modify an image in a program such as Photoshop are well known. The goal of the offset, as described and explained herein, is to compensate for the poor image quality produced by the resin lens 102. In particular, the sensor array 132 will create an image pattern after having taken an image of the test pattern 172. This image pattern is compared to the reference data 174 to determine by electronic comparison where the image pattern differs from the reference data 174. The image pattern is modified electronically as appropriate in order to match the reference data 174. The changes which need to be made from the actual image obtained of test pattern 172 to obtain the reference data 174 will be the offset amount, which is stored as an electronic file in the memory 166. This offset can then be applied to later images that are taken in order to transform that obtained image into a form that corresponds to the actual image prior to having passed the resin lens 102. Based on the description as provided herein, together with available publications in the art, a person of skill would be able to write the code to compute the offset to be used between an actual test pattern 172 and the reference data 174, and therefore the specific details of this code need not be described herein. The description as provided herein of the image compensation method and its operation are sufficient for one of skill in the art to create and store such a program 168 in the memory 166.

There is currently image recognition software that is well known in the art and widely available today, that can distinguish whether or not an image contains a close-up picture of a human face, a distant landscape, or other particular features. In the event that the camera takes a photograph that includes such particular and easily recognizable subjects, the offset to be used for image correction can be selected automatically or manually from various offset choices stored in memory. For example, a particular offset that has been computed for use in portrait photography can be selected if the photograph is recognized as being a portrait or primarily composed of human faces, instead of using generic offset values for a standard test pattern 172, or instead of using a composite offset that has been computed by combining the results of multiple test patterns 172 from multiple reference data 174.

Following the calibration method for image compensation 180, an image of a scene that is acquired by the low profile camera module 100 can be automatically corrected to compensate for the resin lens 102. Applying such a correction to the image data, after it is acquired by the resin lens 102, can be thought of as a type of software filter, i.e., a filter for altering the image data obtained to more closely correspond to the actual image itself. Use of the software filter is much less expensive than providing a high quality lens. Furthermore, the resin lens 102 is more durable, and therefore, is better suited for use in a consumer product like a smart phone, which is likely to be heavily used, with risk of damage.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

It will be appreciated that, although specific embodiments of the present disclosure are described herein for purposes of illustration, various modifications may be made without departing from the spirit and scope of the present disclosure. Accordingly, the present disclosure is not limited except as by the appended claims.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A camera module comprising:
    a substrate;
    an integrated circuit die attached to the substrate, the integrated circuit die including one or more light sensing devices and electronic components operable to capture, transmit, and process images;
    a resin lens assembly including a resin optical lens portion that is operable to be the sole lens member to change a focal point of light to direct light onto an image plane of the integrated circuit die and a resin flange that extends as a contiguous single part of the resin optical lens portion from an annular, outer perimeter of the resin lens; and
    a mount around the perimeter of the resin lens, an inner foot of the mount being on top of the resin flange and affixed thereto by an adhesive causing the resin lens assembly to have edges that extend underneath the mount, and an outer foot of the mount being affixed to the substrate to secure the resin lens assembly to the integrated circuit die, the mount securing the resin optical lens portion on top of the integrated circuit die and with the optical lens portion that is the sole light focusing lens member and is in direct contact with the integrated circuit die the light and the uppermost layer of the die.

2. The camera module of claim 1, further comprising instructions that cause one or more of the electronic components to apply a correction to the images, the correction based on a captured image of a test pattern.

3. The camera module of claim 2 wherein the correction is applied automatically as an image filter operable to alter images as they are captured.

4. The camera module of claim 1 wherein the mount is a housing in the form of a one-piece arched surround structure having a center opening.

5. The camera module of claim 1 wherein the resin lens is formed from a drop of liquid resin that is subsequently cured to maintain a substantially hemispheric shape of the drop.

6. The camera module of claim 1 wherein the resin lens is pre-molded into a substantially hemispheric shape with a flat flange around the outer edges of the hemispheric shape.

7. The camera module of claim 1 wherein the substrate is a printed circuit board having layers of glass fibers and epoxy resin.

8. A low profile camera module, comprising:
a multi-layer substrate;
an integrated circuit die attached to the multi-layer substrate, the integrated circuit die including a microelectronic image processing system;
an image sensor array on the integrated circuit die;
a microlens that includes a resin optical lens portion that is the sole lens member operable to change a focal point of light to direct light onto an image plane of the integrated circuit die;
a resin flange that extends as a contiguous single part of the microlens from an annular, outer perimeter of the microlens; and
a housing surrounding the microlens, a first foot of the housing being on top of the resin flange and affixed thereto by an adhesive causing the microlens to have edges that extend underneath the housing, and a second foot of the housing being affixed to the substrate to secure the optical lens portion directly to the integrated circuit die, the housing securing the optical lens portion that is the sole light focusing lens member of the microlens to be on top of, and in direct contact with, the uppermost layers of integrated circuit die with no other material positioned between the optical lens portion that provides the sole focus of the light and the uppermost layer of the die.

9. The low profile camera module of claim 8 wherein the microlens is made, at least partially, of the resin material.

10. The low profile camera module of claim 8 wherein the microlens is coated with a resin material.

11. The low profile camera module of claim 8 wherein the microlens is provided as part of a pre-molded resin assembly that includes an extended resin flange on which a portion of the housing rests.

12. The low profile camera module of claim 8, further comprising a liner in contact with the housing, the liner extending over the microlens.

13. The low profile camera module of claim 8 wherein the microlens has a substantially hemispherical shape.

14. The low profile camera module of claim 8 wherein the housing surrounding the microlens is made of a thermoplastic material.

15. The low profile camera module of claim 8 wherein the microlens has a diameter sized to accommodate an image sensor array.

16. The low profile camera module of claim 8 wherein the microlens has a height profile that is lower than a height profile of the housing.

* * * * *

UNITED STATES PATENT AND TRADEMARK OFFICE
CERTIFICATE OF CORRECTION

PATENT NO. : 9,723,186 B2  
APPLICATION NO. : 14/183937  
DATED : August 1, 2017  
INVENTOR(S) : Loic Pierre Louis Renard et al.

It is certified that error appears in the above-identified patent and that said Letters Patent is hereby corrected as shown below:

In the Claims

Column 9, Line 2:
"and is in direct contact with the integrated circuit die the light" should read:
--and is in direct contact with the integrated circuit die with no other material positioned between the optical lens portion that provides the sole focus of the light--.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*